June 8, 1965 A. STOOP 3,188,577

AUTOMATIC GAIN CONTROL CIRCUIT FOR AN AMPLIFIER

Filed Jan. 7, 1960 2 Sheets-Sheet 1

Inventor
A. STOOP
By [signature]
Attorney

June 8, 1965 A. STOOP 3,188,577

AUTOMATIC GAIN CONTROL CIRCUIT FOR AN AMPLIFIER

Filed Jan. 7, 1960 2 Sheets-Sheet 2

Inventor
A. STOOP
By Albert Reis
Attorney

United States Patent Office 3,188,577
Patented June 8, 1965

3,188,577

AUTOMATIC GAIN CONTROL CIRCUIT FOR AN AMPLIFIER

Alfons Stoop, Antwerp, Belgium, assignor to International Standard Electric Corporation, New York, N.Y., a corporation of Delaware Filed Jan. 7, 1960, Ser. No. 976
Claims priority, application Belgium, Jan. 20, 1959, 574,887
2 Claims. (Cl. 330—136)

Figure 1:
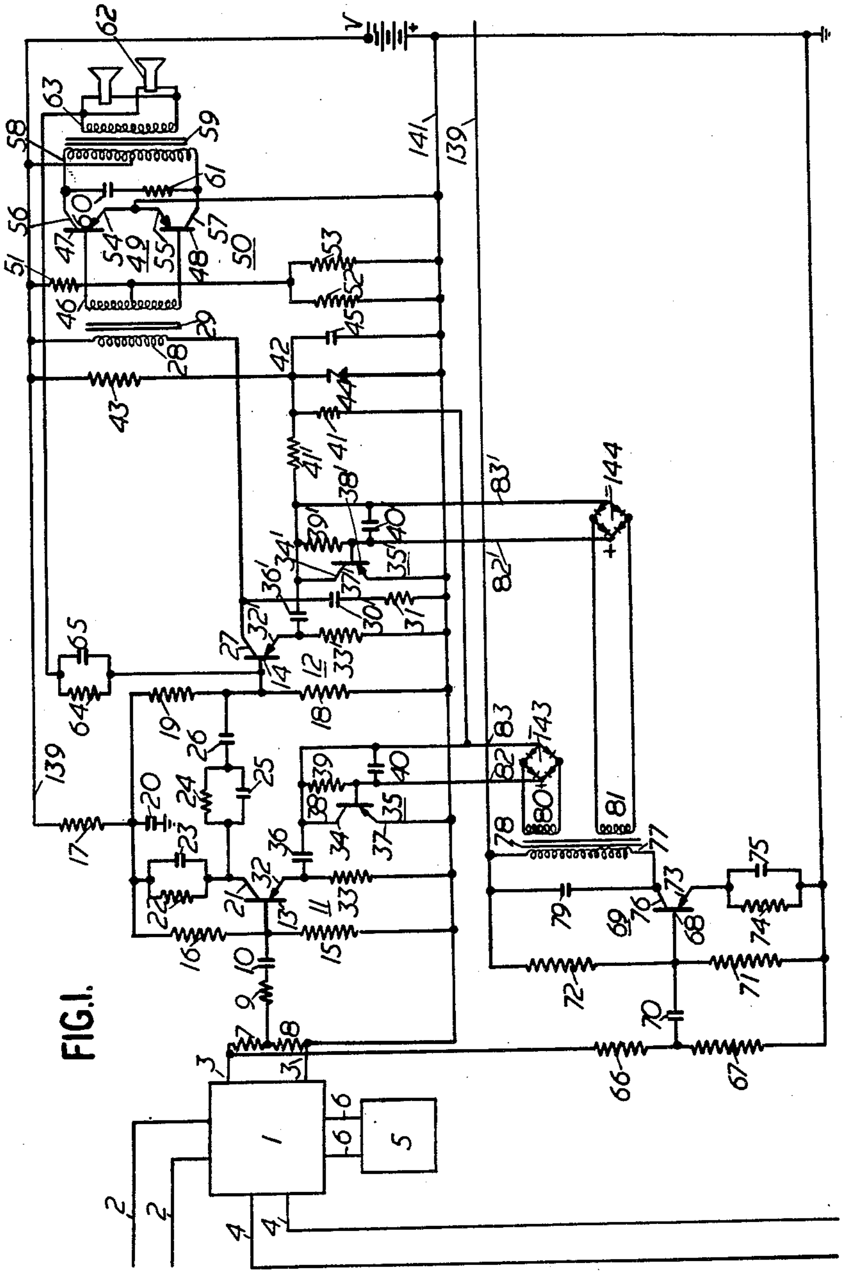

The present invention relates to a loudspeaker telecommunication system and more particularly to a loudspeaker telecommunication system wherein each communication set comprises a microphone coupled to a bidirectional line via a first voice frequency amplifier and voice reproduction means connected to said line via a second voice frequency gain controlled amplifier.

It is an object of the present invention to realize a loudspeaker telecommunication system wherein the loudspeakers can be mounted next to the microphone.

It is another object of this invention to provide new and unique automatic gain controlled amplifiers for use in driving transducers used in loudspeaking telephone systems.

In accordance with another characteristic of the invention a column of loudspeakers is mounted vertically with a hyperdirective microphone on top of it.

This arrangement has been found satisfactory from the point of view of acoustic reactions and at the same time it affords a compact mounting arrangement suitable for association with an ordinary telephone set.

The above described loudspeaker system may particularly be designed for being used in a telephone system. Using a loudspeaker amplifier which is not provided with an automatic gain control would however deliver loudspeaker signals varying between very large limits due to the transmission of the input signals through a telephone line the level of which is able to vary e.g. from 0 decibels (1 milliwatt) to —30 decibels. Indeed small input signals as well as large input signals would be amplified with the same amplification factor. This is naturally undesirable and therefore an automatic gain control circuit for an amplier has been included in the loudspeaker amplifier circuit. This automatic gain control circuit for an amplifier comprising at least one amplifying stage in which a branch common to the input and the output circuits of said amplifying stage includes an impedance and a decoupling capacitor.

In accordance with another characteristic of the invention said capacitor and said impedance are interconnected at one end and are intercoupled at their other ends through an asymmetrically conducting element the impedance of which is controlled by a rectified signal which is proportional to the signal to be amplified.

A somewhat similar circuit however not used for automatically controlling the gain of an amplifier, is known from U.S. Patent No. 2,698,878 of J. Martens issued January 4, 1955 wherein said asymmetrically conducting element is constituted by a diode. The working of this system is however such that this diode which is normally not conductive is rendered conductive due to the potential of said one end being increased to a sufficient value when an input signal having a sufficient amplitude is applied to the control electrode of said amplifier. Thus said capacitor is brought in parallel with said impedance and contrary to the regulating arrangement of the present invention, the gain of the amplifier is sharply increased as soon as the input signal reaches a sufficient amplitude.

In accordance with another characteristic of the invention said asymmetrically conducting element is constituted by a multi-electrode amplifying device with at least three electrodes, e.g. a transistor triode, the first and second electrodes of which are respectively connected to said other ends and that said rectified signal is applied across said third and either the first or the second electrode of said device.

Figure 2:
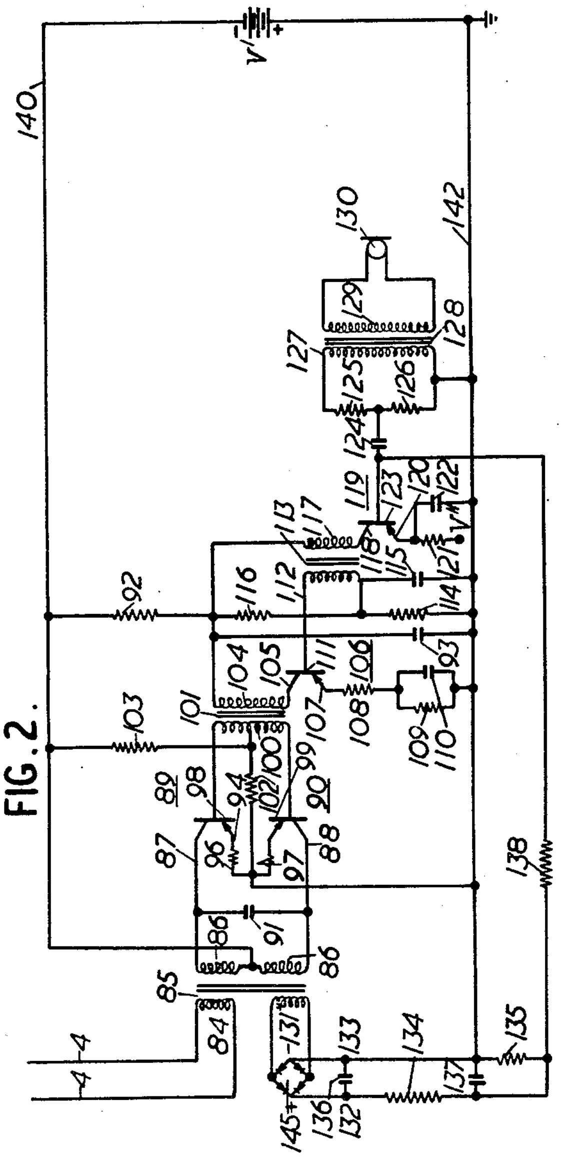
Figure 3:
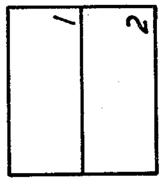

The above mentioned and other objects and features of the invention will become more apparent and the invention itself will be best understood by referring to the following description of embodiments taken in conjunction with the accompanying drawings in which:

FIGS. 1 and 2, assembled as shown on FIG. 4, respectively represent the loudspeaker and microphone amplifying circuits;

FIG. 3 indicates how the FIGS. 1 and 2 have to be assembled.

Principally referring to FIGS. 1 and 2, block 1 represents a hybrid network e.g. a hybrid transformer, which is coupled to the bidirectional line 2. The loudspeaker and microphone circuits are connected to this hybrid network via the two-wire lines 3 and 4 respectively, while a balancing network, represented as a block 5, is coupled thereto through the two-wire line 6.

It is to be remarked that the negative terminal of each of the D.C. sources V (FIG. 1) and V′ (FIG. 2) is connected to the conductors 139 and 140 respectively, while their positive grounded terminals are coupled to the conductors 141 and 142 respectively.

Principally referring to FIG. 1 the loudspeaker circuit will now be described. An input signal appearing at the line 3 of the hybrid network 1 is applied via the voltage divider, including the resistors 7 and 8, via the resistor 9 and the coupling capacitor 10 to the base 13 of the PNP transistor 11 which constitutes, together with its associated elements the first stage of the loudspeaker amplifier.

The second stage of this amplifier is constituted by the PNP transistor 12 and its associated elements.

The bases 13 and 14 of transistors 11 and 12 respectively, are biased at a suitable value by the resistors 15, 16, 17 and 18, 19, 17 respectively, connected between ground and —V. The resistor 17 is further decoupled by means of the grounded capacitor 20. The connection point between the resistors 16 and 17 is coupled to the collector 21 of transistor 11 via the parallel connected resistor 22 and capacitor 23. This collector 21 is further coupled to the base 14 of transistor 12 through the parallel connected resistor 24 and capacitor 25, and the coupling capacitor 26. The elements 22 to 26 constitute a bandpass filter for blocking the low as well as the high frequencies of the speech. The collector 27 of the transistor 12 is on one hand connected to —V via the primary winding 28 of the balanced transformer 29 and on the other hand to ground via the capacitor 30 serially connected to resistor 31 and damping the high frequency response.

The emitters of the transistors 11 and 12 are grounded: the emitter 32 of transistor 11 via biasing resistor 33 and the emitter 32′ of transistor 12 via biasing resistor 33′. These emitters are further each connected to an identical circuit and therefore only one of these circuits will be described. The corresponding elements in the other circuit carry the same identification number but provided with a prime.

The emitter 32 of transistor 11 is coupled via a by-pass capacitor 36, on one hand to the collector 34 of the PNP transistor 35 and on the other hand via resistor 41 to a point 42. The emitter 37 of this transistor 35 is directly grounded, while its base is connected to its collector through a resistor 39 and a smoothing capacitor 40 in parallel.

The potential of the point 42 is stabilised since it is located between the resistor 43 and the Zener diode 44 with capacitor 45 in parallel. Indeed, this diode 44 has been connected in the conductive sense and due to this it provides a very small constant voltage at the point 42, e.g. 0.7 volts. When the transistor 35 is rendered conductive, the capacitor 36 shunts the resistor 33 through transistor 35 and consequently no negative feedback to transistor 11 is provided. On the other hand when the transistor 35 is not conductive the resistor 33 is not shunted, a signal voltage developed across resistor 33 and thus provides a negative feedback to transistor 11. The control of the conductivity of transistors 35—35′ will be described later.

The third stage of the loudspeaker amplifier is a push-pull stage delivering a high output power. The input circuit of this stage includes the balanced secondary winding 46 of transformer 29, the bases 47 and 48 of the two PNP transistors 49 and 50, the emitters 54 and 55 of these transistors and the parallel connected resistors 52 and 53, the upper end of which is connected to the midpoint of the secondary winding 46. The output circuit of the transistors 49 and 50 includes the collectors 56 and 57, the balanced primary winding 58 of the push-pull output transformer 59, the midpoint of this primary winding, the resistor 51, the resistors 52, 53 in parallel and the emitters 54, 55. The capacitor 60 and the resistor 61 connected in parallel with the primary winding 58 constitute a high frequency damping network. The resistor 53 has a negative temperature coefficient and is employed for stabilizing the collector current of transistors 49 and 50. Indeed, when the collector currents increase, the current flow in the resistor 53 also increases thus diminishing the value of this resistance and increasing the potential of the bases of these transistors. Consequently this counteracts the increase of collector currents.

The amplified signals are applied to the plurality of parallel connected loudspeakers 62 via the secondary winding 63 of the transformer 59. A part of the voltage appearing at this secondary is fed back through the frequency, dependent dipole constituted by the resistor 64 and the capacitor 65 in parallel, to the base 14 of transistor 12. Thus a negative feedback increasing with frequency is provided to improve the stability of the amplifier.

The circuit controlling the conductibility of the transistors 35 and 35′ will now be described. The signal appearing at the output leads 3 of the hybrid network is not only applied to the input of the amplifier but also applied via a potentiometer, constituted by the resistors 66 and 67, and the coupling capacitor 70 to a separate amplifier which includes the PNP transistor 69. The base 68 of this transistor is suitably biassed by the resistors 71, 72 connected between ground and —V, while its emitter 73 is grounded via the biassing resistor 74 and capacitor 75 in parallel. The collector 76 of the transistor 69 is biassed at a negative potential via the primary winding 77 of a transformer 78. The primary winding 77 is shunted by the capacitor 79. The signals appearing in the two secondary windings 80 and 81 are rectified by diode bridges 143 and 144 respectively. In this manner a potential appears on the leads 82 and 82′ which is positive with respect to the potential of leads 83 and 83′. The leads 82, 82′ are connected to the base of the transistors 35, 35′ respectively, while the leads 83, 83′ are coupled to the collectors thereof.

The working of the arrangement is now as follows. When a large amplitude signal appears at the leads 3, a large rectified signal is also obtained at the output of each of the diode bridges 143 and 144 and smoothed by the capacitors 40 and 40′. Thus the bases 38 and 38′ of the normally conducting transistors 35 and 35′ respectively are rendered sufficiently positive to bring them to cut-off. When they are cut-off there is no longer a decoupling path through capacitor 36, 36′ and transistors 35, 35′ by passing resistor 33, 33′ respectively. The bias resistors 33, 33′ are thus not decoupled by the capacitors 36, 36′ hence, current flows through the resistors 33, 33′ so that they provide a negative feedback and reduce the gain of transistors 11, 12. The amplification is thus diminished as a function of the consequent variation in the impedance in the emitter circuit of transistors 11, 12 as the input signals increase in amplitude.

When however a sufficiently small amplitude signal appears at the leads 3 a small rectified signal is obtained at the output of each of the diode bridges 143, 144. Thus the potential of the bases 38, 38′ of the transistors 35, 35′ is sufficiently negative to main them into conduction, thus connecting the capacitors 36, 36′ to ground. The bias resistors 33, 33′ are thus decoupled so that they cannot provide a negative feedback. Due to this the amplifier transistors 11 and 12 provide a maximum gain.

For example it has been found that an output variation of only 6 decibels corresponds to a variation of —20 to 0 decibels in the input level.

Principally referring to FIG. 2 the microphone amplifier will now be described. The signals appearing at the terminals of the cardioid microphone 130 during a conversation are applied to the primary winding 129 of a transformer 128. The secondary winding 127 of this transformer is shunted by the resistors 125 and 126 and the connecting point of these resistors is coupled via the coupling capacitor 124 to the base 123 of the transistor 119 which constitutes, together with its associated elements, the first stage of the microphone amplifier.

The emitter 120 of the transistor 119 is connected to the positive D.C. source V″ via the resistor 120 and is coupled to ground through the capacitor 122. Its collector 118 is connected to the lower end of the primary winding 117 of the transformer 113, the secondary winding 112 of which is connected between the base 111 of the transistor 106 and a point situated between, on the one hand the resistor 114 and the decoupling capacitor 115 in parallel and on the other hand the resistor 116 in series with the resistor 92 which is decoupled by means of the grounded capacitor 93. The PNP transistor 106, together with its associated elements, constitutes the second stage of the microphone amplifier. Its collector 105 is connected to the point situated between the resistors 92 and 116, while its emitter 107 is grounded via the resistor 108 and the resistor 109 connected in parallel with the by-pass capacitor 110. The resistor 108 thus provides a negative feedback.

The third stage of the microphone amplifier is a push-pull stage. The input circuit of this stage includes the secondary winding 100 of the balanced transformer 101 with a mid-point tapping connected to potential —V′ through resistor 103, the bases 98, 99 of the two PNP transistors 89, 90, the emitters 94, 95 of these transistors, the resistors 96, 97, the connection point of which is coupled via resistor 102 to the midpoint of the secondary winding 100. The output circuit of the transistors 89, 90 includes the collectors 87, 88 and the primary winding of 86 of the push-pull output transformer 85, with a mid-point tapping directly connected to potential —V′. The capacitor 91 shunts the primary winding 86. A part of the amplified microphone signal appears at the terminals of the secondary winding 84, and is applied via the leads 4 and the hybrid network 1 to the line 2. Another part of this signal appears at the terminals of the secondary winding 131 and is rectified by the diode bridge 145. A rectified signal, filtered by the capacitor 136, thus appears at the terminals 132 and 133. A part of this rectified voltage, further filtered by capacitor 137, is obtained via the potentiometer 134, 135 and is applied through the resistor 138 to the base of the transistor 123. In this manner an automatic control of the volume is obtained. This is necessary whenever the energy on the line has to be below a fixed value, e.g. 1 mW.

It will be obvious that the amplifiers can also be fed by a D.C. current via the bidirectional line by means of appropriate circuits well known in the art.

While the principles of the invention have been described above in connection with specific apparatus, it is to be clearly understood that this description is made only by way of example and not as a limitation on the scope of the invention.

I claim:

1. An automatic gain control circuit for a signal amplifier comprising at least one amplifying stage having an input circuit and an output circuit, negative feedback means common to said output and input circuits for providing said automatic gain control, said feedback means comprising a fixed impedance means, means including a variable impedance means and a decoupling capacitor connected in series bridging said fixed impedance means to provide variable negative feedback to said amplifying stage, means for supplying an input signal to said input circuit, rectifier means for rectifying a portion of said input signal and means for supplying said rectified signals to said variable impedance means to cause a varation in the impedance thereof proportional to the amplitude of the rectified signals, said impedance variation altering the negative feedback to control the gain of said amplifying stage.

2. An automatic gain control circuit as set forth in claim 1 wherein said variable impedance means comprises a transistor having base, emitter and collector electrodes with the said fixed impedance and capacitor connected between said emitter and collector electrodes and said rectified signal supplied between said base and said collector electrodes.

References Cited by the Examiner

UNITED STATES PATENTS

| | | | |
|---|---|---|---|
| 2,363,813 | 11/44 | Sommers | 330—136 |
| 2,516,776 | 7/50 | Johnson | 179—1.4 |
| 2,695,338 | 11/54 | Doriot | 330—136 |
| 2,702,319 | 2/55 | Ryall | 179—1.4 |
| 2,713,620 | 7/55 | Tilley | 330—130 |
| 2,799,735 | 7/57 | Beckman et al. | 330—130 |
| 2,802,100 | 8/57 | Beck | 330—136 |
| 2,956,237 | 10/60 | Jacobs | 330—136 X |
| 3,030,022 | 4/62 | Gittleman | 330—75 X |
| 3,109,993 | 11/63 | Blair | 330—145 X |

ROY LAKE, *Primary Examiner.*

L. MILLER ANDRUS, BENNETT G. MILLER, NATHAN KAUFMAN, *Examiners.*